Oct. 13, 1936.   D. W. HABER   2,057,096
HANDLE CONSTRUCTION FOR UTENSILS
Filed March 20, 1935
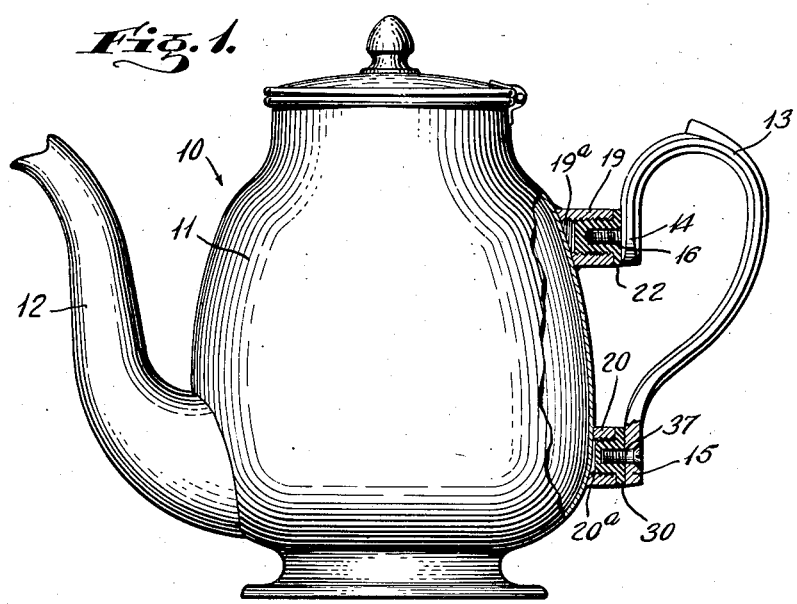
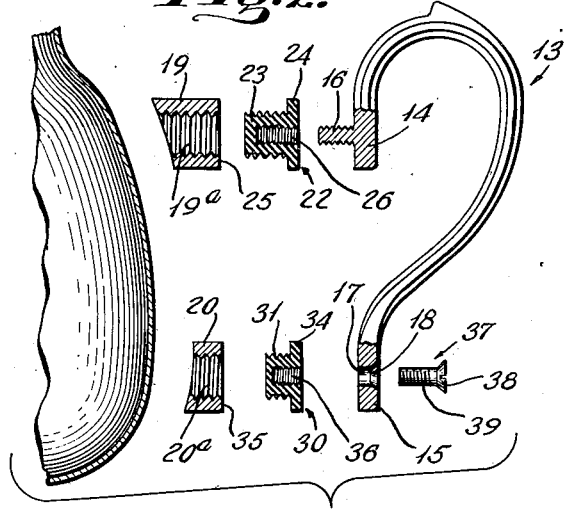
INVENTOR
DAVID W. HABER
BY
ATTORNEY Patented Oct. 13, 1936

2,057,096

UNITED STATES PATENT OFFICE 2,057,096

HANDLE CONSTRUCTION FOR UTENSILS

David W. Haber, Bronx, N. Y.

Application March 20, 1935, Serial No. 11,914

4 Claims. (Cl. 16—119)

This invention relates to handle construction for utensils, such as pots or vessels.

An object of this invention is to provide in a utensil of the character described, highly improved means for insulating the handle from the body of the pot to eliminate metal to metal contact between the handle and pot.

A further object of this invention is to provide a neat, compact and durable handle construction for a utensil of the character described, which shall be relatively inexpensive to manufacture, easy to assemble, and withal practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of a utensil embodying the invention, with parts in cross-section; and Fig. 2 is an elevational, separated view with parts in cross section of a portion of the pot, the handle and insulating parts.

Referring now in detail to the drawing, 10 designates a pot provided with a body portion 11, a spout 12 and a handle 13. The handle 13 may be of any suitable shape and is provided with end portions 14 and 15, here shown for the purpose of illustration as extending downwardly and being in alignment. The portion 14 is provided with a forwardly extending integral screw threaded stud 16, whereas the lower portion 15 is formed with a through opening 17 having a countersunk portion 18 for receiving the head of the screw, as will appear hereinafter.

Soldered to the body 11 are a pair of ferrules or small horizontal tubular members 19 and 20 preferably internally screw threaded, as at 19a and 20a. Screwed to the tubular member 19 is a member 22 made of any suitable insulating material and having a screw threaded portion 23 received within the screw threaded opening 19a, and a vertical circular flange 24 contacting the outer edge 25 of the member 19, the outer diameter of the flange 24 preferably being substantially equal to the outer diameter of the tube 19.

The member 22 is formed with a central screw threaded opening 26 terminating short of the end of the portion 23 and receiving the screw threaded stud 16 on the handle portion 14, said portion 14 contacting the flange 24 when the handle is assembled. Screwed to the tubular member 20 is an insulating member 30 substantially similar to the insulating member 22 and having a screw threaded portion 31 received within the threaded opening 20a. The member 30 likewise has a flange 34 contacting the outer surface or edge 35 of the tubular member 20 and of the same diameter as said member. Said insulating member 30 is also formed with an axial screw threaded opening 36 terminating short of the end of the portion 31.

Extending through the opening 17 is a screw 37 having a head 38 received within the countersunk portion 18, and a screw threaded shank 39 screwed within the threaded opening 36 of the insulating member 30. In assembling the device, the members 19 and 20 are first soldered to the body in correct position and the insulating members 22 and 30 screwed within the threaded openings 19a and 20a. The stud 16 of the handle 13 is then engaged within the opening 26 and the handle turned until the stud is fully screwed within said opening and the portion 14 of the handle contacts the flange 24. The handle is then adjusted to bring the portion 15 thereof into contact with the flange 34 of the insulating member 30 and the screw 37 is thereafter passed through the opening 17 and screwed within the axial screw threaded opening 36. The head of the screw may then be covered with solder to fill the kerf and cover the head of the screw, the solder then being finished to present a smooth appearance.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A handle construction for utensils and the like, comprising a pair of tubular members adapted to be fastened to said vessel, said tubular members having internally screw threaded openings, an insulating member screwed within each of said screw threaded openings, a handle member having a pair of end portions, and means for screwing said end portions to said insulating members.

2. A handle construction for utensils and the like, comprising a handle member having a pair of end portions, one of said end portions having an integral screw threaded stud, and the other of said end portions being provided with a through opening, a pair of insulating members having screw threaded openings and adapted to be screwed to said vessel, one of said insulating members being adapted to receive the screw threaded stud on one of the end portions of the handle, and a screw extending through the opening in the other end portion of the handle and being adapted to be screwed within the threaded opening of the other of said insulating members.

3. A handle construction for a utensil having a body portion comprising a separate member extending from the outer surface of said body portion and having an internally screw threaded opening, a member made of insulating material having a portion screwed within said screw threaded opening and provided with a flange contacting the end of said first member, said insulating member having an axial threaded opening, a handle member and screw threaded means received within said axial opening for fixing the handle to the body, whereby said handle may be attached to said utensil without the necessity of providing holes in said body portion.

4. A handle construction for a utensil with a body portion having a pair of extensions attached to the outer surface of said body portions, said extensions having screw threaded openings therein, comprising insulating members screwed within said openings, a handle member having end portions contacting said insulating members, and screw threaded means for fixing said end portions to said insulating members, whereby said handle may be attached to said utensil without the necessity of providing holes in said body portion.

D. W. HABER.